Aug. 25, 1931.  W. D. SMITH  1,820,095
RUBBER WITH MUD GUARD DEVICE
Filed June 17, 1929

INVENTOR
Wallace D. Smith
BY Chappell Earl
ATTORNEYS

Patented Aug. 25, 1931

1,820,095

UNITED STATES PATENT OFFICE

WALLACE D. SMITH, OF KALAMAZOO, MICHIGAN

RUBBER WITH MUD GUARD DEVICE

Application filed June 17, 1929. Serial No. 371,647.

The objects of the invention are:

First, to provide as a part of a rubber overshoe structure, a mud guard which can be brought into use or be folded up in contact with the body of the rubber by a simple manipulation.

Second, to provide such a structure that is very economical to produce and that shall be neat in appearance when not in use as a mud guard and shall be an effective mud guard when in use.

Objects pertaining to details will definitely appear from the description to follow.

A structure fully embodying my invention is illustrated in the accompanying drawings, in which.

The parts will be identified by their numerals of reference which are the same in all the views.

1 is the body of the rubber. 2 is the heel portion. 21 is the heel reinforce above which extends the heel mud guard 3 which is of soft rubber and joined at the slightly upwardly curved heel point of the reinforce 21 at 31. The edges of the mud guard are serrated at 32.

Figure 1:
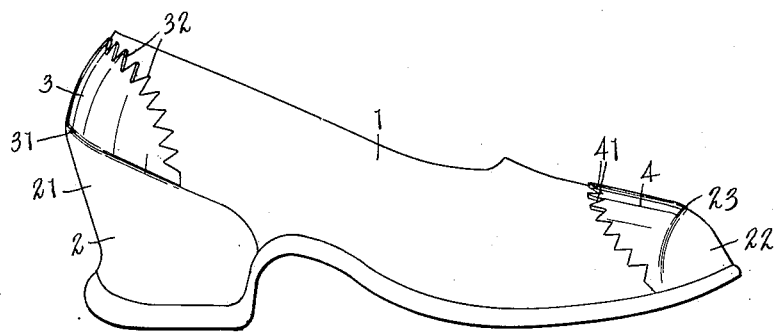
Fig. 1 is a side elevation of a rubber with my improved mud guard in closed and inoperative position.
Figure 2:
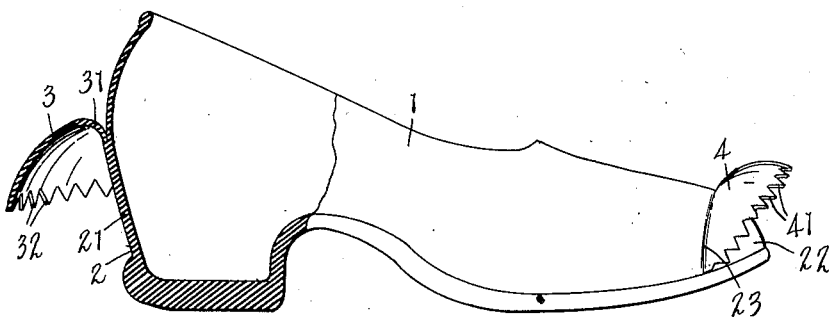
Fig. 2 is a side elevation of the same with the mud guards deflected into operative position, the heel portion being shown in central sectional elevation on line 2—2 of Fig. 3.
Figure 3:
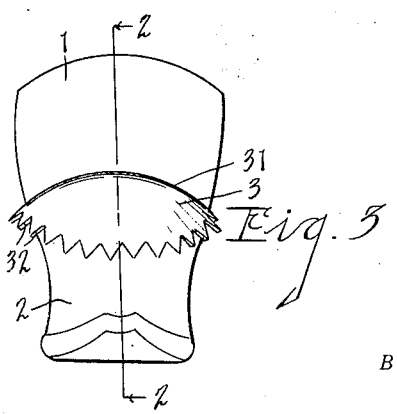
Fig. 3 is a rear elevation of the mud guard as seen in Fig. 2.

The mud guard is capable of being deflected over like a half umbrella, as seen in Fig. 2, when the serrations 32 point downwardly and the whole structure forms an effective guard for catching any mud or slush that may be thrown up by the action of the heel.

The toe guard 4 is of exactly similar construction with serrations 41 and connected to the rear edge of the toe reinforce 22 at the seam 23, which is preferably slightly deflected at the center point. This toe guard turns over in the form of a half umbrella, as seen in Fig. 2, and effectively catches any slush or mud that may be thrown up by the action of the toe.

It is preferred, of course, to form these guards of soft rubber and integral with the rubber as shown. They may, however, be formed as attachments and be cemented or cemented and vulcanized to rubbers already in use.

The structure would be effective without the serrations but the serrations serve a very useful purpose in insuring an accurate fit of the parts when folded into contact with the rubber when not in use, giving an ornamental effect. The serrations also serve their purpose effectively in leading any drip off the guard when in use, deflecting mud or slush.

Having thus described my invention, what I claim as new and desire to secure by Letters Patent, is:

1. A rubber with a mud guard consisting of a flexible, deflectable, soft rubber shield integrally united with said rubber with serrated edge conforming normally to the body of the rubber when not in use and adapted to be deflected to form an umbrella guard to serve as a deflector.

2. A rubber with a mud guard consisting of a flexible, deflectable, soft rubber shield integrally united with said rubber conforming normally to the body of the rubber when not in use and adapted to be deflected to form a guard to serve as a deflector.

3. A rubber with a mud guard consisting of a flexible, deflectable, soft rubber shield intergrally united with said rubber at the heel with serrated edge conforming normally to the body of the rubber when not in use and adapted to be deflected to form a guard to serve as a deflector.

4. A rubber with a mud guard consisting of a flexible, deflectable, soft rubber shield integrally united with said rubber at the heel, conforming normally to the body of the rubber when not in use and adapted to be deflected to form a guard to serve as a deflector.

In witness whereof I have hereunto set my hand.

WALLACE D. SMITH.